(12) United States Patent
Sadhasivan et al.

(10) Patent No.: US 6,928,456 B2
(45) Date of Patent: Aug. 9, 2005

(54) METHOD OF TRACKING OBJECTS FOR APPLICATION MODIFICATIONS

(75) Inventors: Akila Sadhasivan, Eldorado Hills, CA (US); Richard P. Garner, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 908 days.

(21) Appl. No.: 09/800,688

(22) Filed: Mar. 6, 2001

(65) Prior Publication Data

US 2002/0128994 A1 Sep. 12, 2002

(51) Int. Cl.[7] .............................................. G06F 17/00
(52) U.S. Cl. ....................... 707/200; 707/102; 707/206; 707/205
(58) Field of Search ................................ 707/200–206, 707/100–102, 1–2, 7–10; 711/1–6, 7–16

(56) References Cited

U.S. PATENT DOCUMENTS 6,779,081 B2 * 8/2004 Arakawa et al. ............ 707/205
6,782,462 B2 * 8/2004 Marion et al. .............. 707/200
6,785,697 B2 * 8/2004 Haustein .................... 707/206

OTHER PUBLICATIONS

Hazard pointers: safe memory reclamation for lock–free objects Michael, M.M.; Parallel and Distributed Systems, IEEE Transactions on , vol. 15, Issue: 6, Jun. 2004.*

Evaluation of an object–caching coprocessor design for object–oriented systems Chang, J.M.; Gehringer, E.F.; Computer Design: VLSI in Computers and Processors, 1993. ICCD '93. Proceedings., 1993 IEEE International Conference on .*

Architectural support for dynamic memory management Morris Chang, J.; Srisa–an, W.; Lo, C.–T.D.; Computer Design, 2000. Proceedings. 2000 International Conference on, Sep. 17–20, 2000.*

* cited by examiner

*Primary Examiner*—David Jung
(74) *Attorney, Agent, or Firm*—Blakely, Sokoloff, Taylor & Zafman LLP

(57) ABSTRACT

A method of directly reading addresses from flash memory using an object tracking table is described. Some applications such as K-Java typically require their data to be stored contiguous in memory. In order to achieve contiguous memory space, free memory is compressed during reclaim. The data compression may alter the address locations within the application files. The object tracking table helps enable direct flash access to modify and update flash object data.

23 Claims, 5 Drawing Sheets

STEP 1: ALLOCATE MEMORY BLOCK 23 AND ROUTE OBJECT 2 AND
OBJECT 3 FROM MEMORY BLOCK 22 TO MEMORY BLOCK 23

STEP 2: DE-ALLOCATE MEMORY BLOCK 22

STEP 3: MOVE OBJECT 2 AND OBJECT 3 BACK TO MEMORY BLOCK 22

| STATE | BITS | DESCRIPTION |
|---|---|---|
| NO STATUS | 1111b | MAY HAVE STARTED COPY TO RECLAIM BLOCK |
| OTT ENTRY VALID | 1110b | OTT ENTRY IS COMPLETELY WRITTEN. |
| OBJECT UPDATE COMPLETE | 1100b | FINISHED UPDATEING THE POINTERS WITHIN THE OBJECT BY RECLAIMING IN PLACE. |

FIG. 5

METHOD OF TRACKING OBJECTS FOR APPLICATION MODIFICATIONS

FIELD OF THE INVENTION

The present invention pertains to the field of flash memory. More particularly, the present invention relates to a method of directly reading addresses from flash memory using an object tracking table.

BACKGROUND OF THE INVENTION

Flash memory is used in a wide variety of products including many types of computing, communication, and consumer electronic devices. Flash memory is a type of nonvolatile memory. Flash memory has been used as file systems for storing data. One such system is the Flash Data Integrator (FDI), which has been used in cell phones and other electronic devices.

The FDI is one embodiment of a flash file system. It consists of paragraph object space, page object space and the free flash pool. FIG. 1 depicts a basic memory map layout. The managed space is the location in the memory block between the lowest address and the highest address. The page object space 11 generally resides at the bottom of the flash memory space 10 and has the lowest address location. The free flash pool 12, or unused flash space, resides on top of the page object space 11. The highest address is the paragraph object space 13, where the page and paragraph object headers are stored. When either the paragraph object space 13 or page object space 11 requires more flash memory space, it takes an entire block from the free flash pool 12.

An object is a method of storing data. In a flash memory block, each object is split into a specific size. In order to write objects to flash memory, allocation of memory space is necessary to ensure that sufficient memory is available to satisfy a request. A memory block may contain an unlimited number of objects. An allocation process performs available memory calculations to determine whether a request can be granted without violating the allocation requirements. De-allocation is needed in order to allow the user to discard an allocated object. This is done by marking the object as "invalid." The memory space is reclaimed during the reclamation part of the de-allocation process. Reclamation occurs during every de-allocation to compress and keep all the objects contiguous in memory.

The reclaim block 14 resides above the managed space. During reclaim, the reclaim block 14 is used for temporary storage of objects. Reclaim is the process of cleaning up all the dirty space in the flash by erasing the space associated with previously used flash memory space. In other words, reclaim erases flash memory associated with de-allocated objects. Every time an object is de-allocated in flash, the de-allocated memory becomes dirty space. To reuse the dirty space, the entire block needs to be erased. The reclaim process involves moving all the valid data into the free flash pool 12, erasing the block, and copying back the data back into the object space.

Flash file systems, such as FDI, often need to support numerous applications. K-Java is one such application. In FDI, K-Java files are stored as objects. A K-Java object may contain internal pointers that reference data within the object or other K-Java objects. These internal pointers may contain physical flash addresses to improve K-Java performance. The file system must ensure that the K-Java reference made via the physical flash address is always valid. Address validity is threatened by the file system reclaim process described previously. This is because the reclaim process can move the object to a new physical flash address, rendering some K-Java internal pointers obsolete. The file system must provide a mechanism to correct the obsolete pointers before they are used.

In addition, the data of each K-Java file must be contiguous in memory space. Many flash file systems fragment file data so that the fragment size is equal to or less than the flash block size. This is inadequate for K-Java file support. A K-Java file must be able to span multiple flash blocks, if necessary to maintain contiguous file data. Therefore, there are advantages to having a reclaim method that compresses space so that the created free space is contiguous.

BRIEF DESCRIPTION OF THE DRAWINGS

The present invention is illustrated by way of example and not limitation in the figures of the accompanying drawings, in which like references indicate similar elements and in which:

FIG. 5 shows possible status states of the Object Tracking Table.

DETAILED DESCRIPTION

A method for directly accessing flash memory with object tracking capabilities is described. The ability to access flash memory directly helps to improve performance in some applications since the flash data can be directly read from flash instead of having to load and access random access memory (RAM). K-Java users can use this "direct access" feature in order to execute K-Java code directly. Direct flash memory access reads data directly from flash. In addition to this feature, applications such as K-Java typically require large data to be stored contiguous in memory in order to function properly. An Object Tracking Table (OTT) helps make it possible by tracking objects that have been moved.

Figure 1:
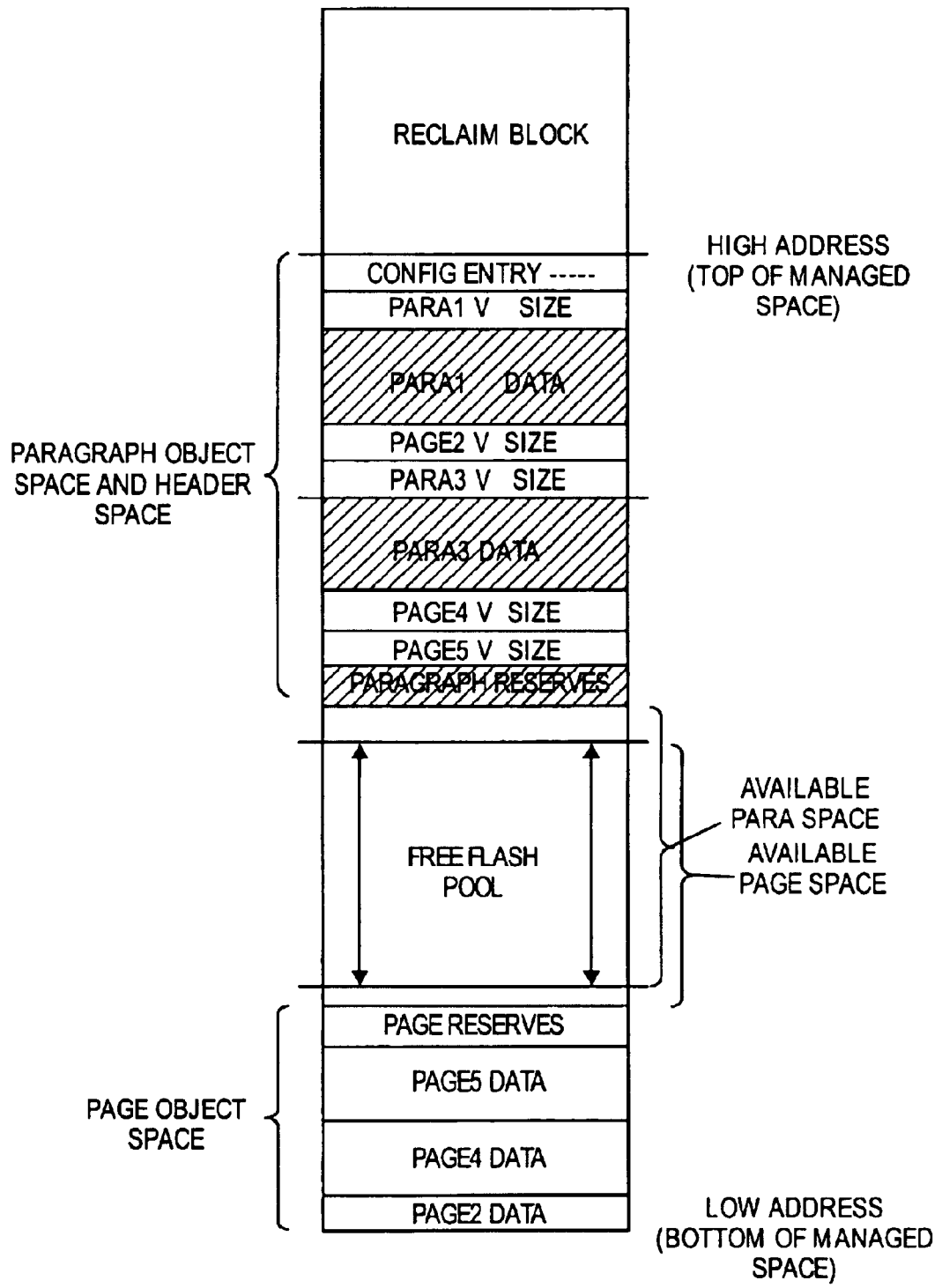
FIG. 1 shows the basic layout of memory map.
Figure 2:
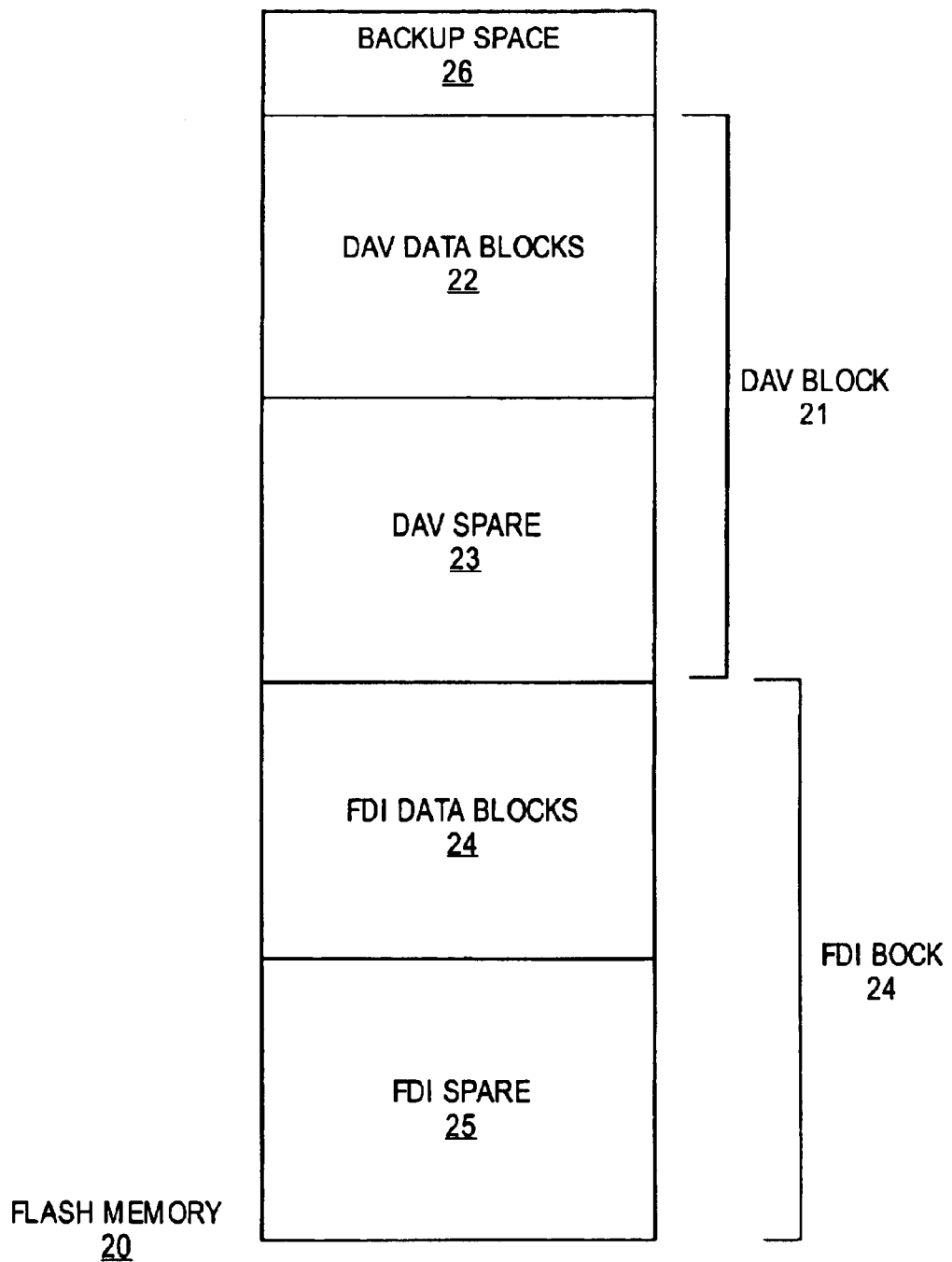
FIG. 2 shows a flash memory with the Direct Access Volume and the Flash Data Integrator.

In order to achieve direct flash memory access, a direct access volume (DAV) has been integrated with the FDI. As such, two volumes exist in the FDI. The first volume is the DAV and the other is the FDI volume. Both reside in the same flash memory part. FIG. 2 shows a flash memory block 20 with both volumes. The DAV 21 provides user applications with the exact flash address to which data is being stored. Besides direct flash access, DAV 21 will also be used for performing allocation, de-allocation, reallocation, reclamation, and recovery functions.

Reallocation is the process of updating an existing object with new data. The new data must be written to the same physical address space as the original object. The space associated with the original object is erased through the reclaim process.

Both the DAV 21 and the FDI 24 have their own spare blocks 23, 26 allocated for reclaim. However, because the spare blocks are stored in one flash memory part, they cannot be erased simultaneously. For example, if the DAV data 22 is being erased, the FDI data 25 erase must be prevented from being spawned since only one block can be erased at a time. Hence, a locking procedure is used to prevent the DAV and the FDI from performing erase operations at the same time. When a reclaim operation is initiated by either the DAV or the FDI, the reclaiming volume sets a flag. When the reclaim is completed, the flag is cleared. Only after the flag has been cleared can another reclaim operation be spawned.

Reclaim is also locked when application code such as the K-Java manager executes a file. As previously discussed, the reclaim flag is used to perform this locking procedure by disabling future reclaim executions until the reclaim flag is cleared. During application file execution, the K-Java manager needs direct access to the flash. Because it utilizes direct pointers to physical addresses within the flash memory, reclaim is not allowed to occur at the same time. Therefore, prior to K-Java file executions, the reclaim is locked by the application code, which makes use of the FDI through function calls. The K-Java files are then executed. The reclaim is unlocked when the K-Java manager is finished executing the file.

During the reclaim, the valid data is moved into the spare block 23, 26, the entire block is erased, the data is compressed, and the data is copied back into the block in compressed form with the bottom portion of the data memory block being freed 22, 25. Thus, whenever an object is deleted, all objects under it in flash are compressed to achieve contiguous free space. In one embodiment of the invention, the DAV object files are compressed during reclaim. While compressing, it is important to track which objects are being modified because programs, such as K-Java, have internal pointers that point to other data in different memory locations.

Figure 3:
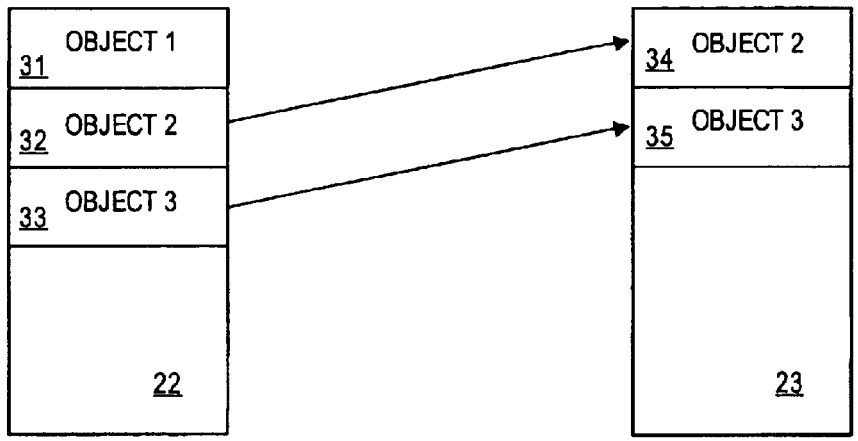
FIG. 3 shows an example of an object reclaim.
Figure 3:
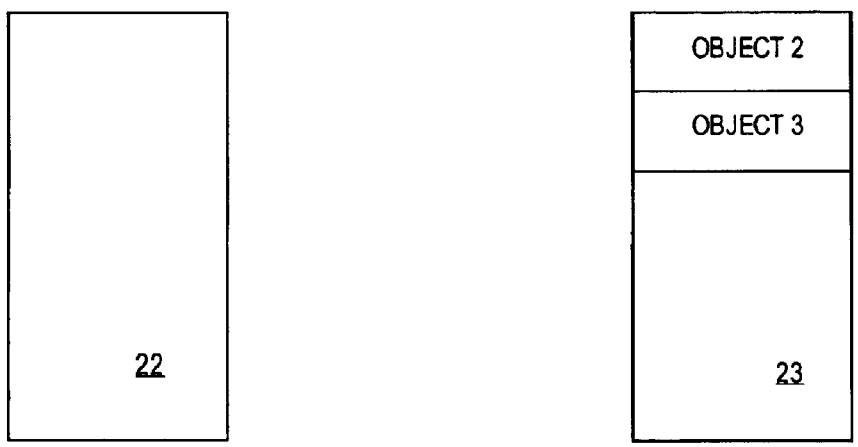
Figure 3:
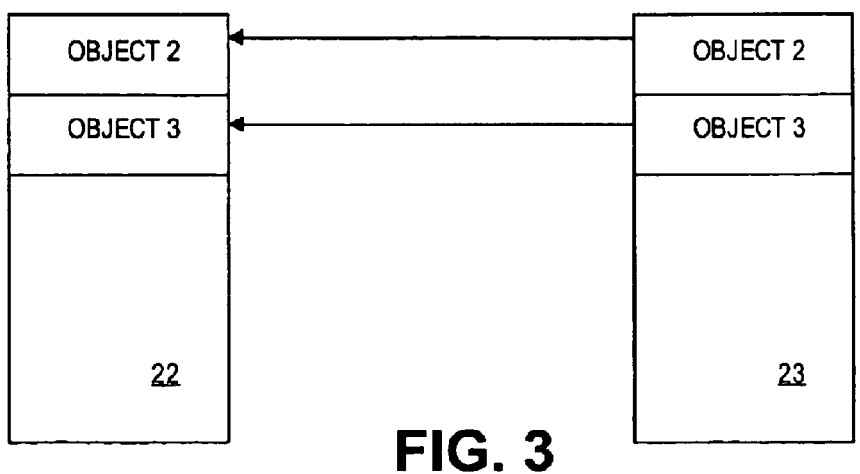

FIG. 3 provides a reclaim example in which objects are de-allocated in order to achieve contiguous free space. In the example, object 1, object 2, and object 3 reside contiguously in memory spaces 31–33 of memory block 22. Object 1 needs to be deleted, while objects 2 and 3 are to be retained. Thus, free space 34 must first be allocated for object 2 in spare memory block 23. Once memory space 34 has been allocated, object 2 may be routed to memory space 34. In addition, prior to object 2 being routed to memory space 34, a backup copy of object 2 is made memory area 26. This is to enable recovery of data in the event of a system power failure.

Next, memory space 35 is allocated, a backup copy of object 3 is made for power failure protection, and object 3 is in turn routed to that memory space 35 in spare memory block 23. Since memory spaces 34 and 35 are contiguous, object 2 and object 3 are compressed when they are routed to their new location in spare memory block 23. The memory block 22, which originally held object 1, object 2, and object 3 may now be safely erased. When memory block's erase is complete, object 2 and object 3 are copied back into memory block 22 in their compressed form. Since object 2 and object 3 have been copied to different physical flash locations within memory block 22, internal pointers of object 2 or object 3 may need to be modified to support applications such as K-Java. A call back function can be provided by the application to make the internal pointer modifications. The modification is made through a reclaiming in place process that will be discussed later in further detail. In this example, even though only object 1 needed to be deleted, object 2 and object 3 compressed during the move in order to achieve contiguous free space for new data to be stored. The objective is to delete space in a fashion so as to make free space contiguous, moving objects to different memory locations in order to free the bottom portion of the memory.

The DAV has three different kinds of reclaim: page reclaim, paragraph reclaim, and total reclaim. FIG. 3 provided an example of a page reclaim, or a reclaim of object space. As previously stated, it is important to track which objects are being modified because programs such as K-Java have internal pointers that point to other data in different memory locations. Thus, the user application must be notified whenever objects are being moved so that it can update the pointer data within the object appropriately. This can be done through call back functions and address tracking. The application must provide a call back function to DAV to be able to modify the data following reclamation. If the application does not need to modify the data object, the call back function returns a Boolean value to indicate that the object modification is not necessary. Otherwise, the object is modified in place in the destination address. Address tracking should maintain information such as the source address (initial object address), destination address (where the object is being moved), and the object size.

The second kind of reclaim is paragraph reclaim. The basic process is the same for both page and paragraph objects. Paragraph reclaim only involves reclamation of paragraph space. Even though object space is compressed during de-allocation, the header space, or paragraph space does not need to be compressed until after reclaim is finished. The paragraph space contains headers and system objects that track all operations for powerless recovery in the event of system power failure. The headers are written to the bottom of the memory block, as opposed to the top of the memory block like data. The third and final reclaim type is total reclaim; it is the reclamation of both page space and paragraph space.

Figure 4:
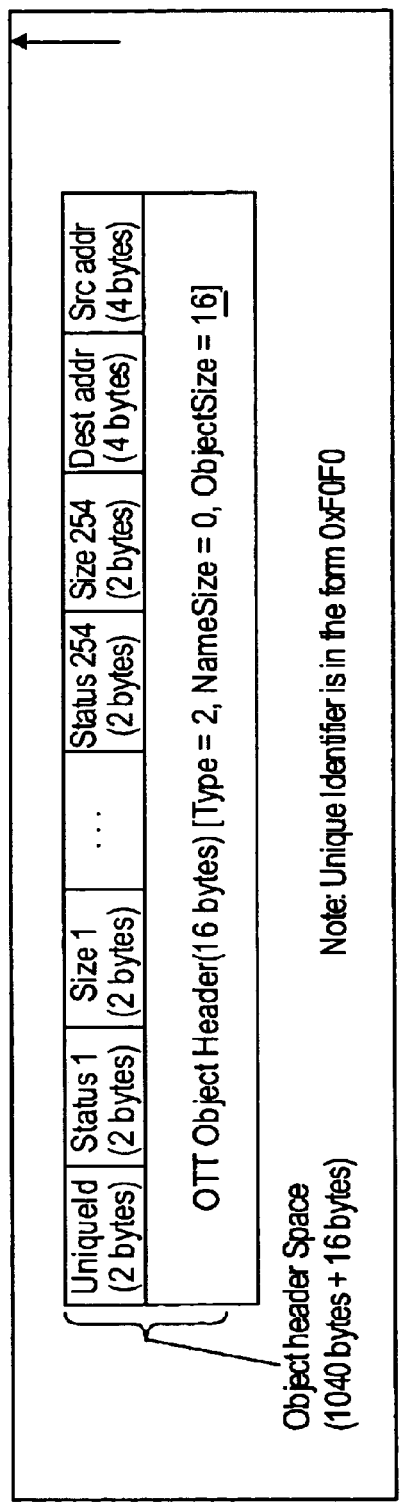
FIG. 4 shows an Object Tracking Table.

To track the process of reallocating the objects after every reclamation, an object tracking table (OTT) is implemented within the DAV block 21. The OTT is one system object located in paragraph space. One embodiment of the OTT is shown in FIG. 4. The OTT 40 enables the larger, contiguously stored data to be provided to customers. It is a paragraph object, which consists of unique identifiers, reference page object, destination address, and source address. Specifically, there is one unique identifier for each paragraph object. The identifier is used for validating the data contained within the table.

The reference page object consists of a status field and a size field. The status field provides information regarding whether the OTT entry is valid or whether the object update is complete. For instance, if there is a system power failure when the size field is being written, the size field could potentially contain corrupt data. Thus, the status field will indicate that the entry is invalid. FIG. 5 depicts a table with one embodiment of the combination of status states. If the least significant bit (LSB) of the status signal 42 is active low or de-asserted, then the OTT entry has been completely written. If the entry has been written, it is possible to identify whether the object update is complete by viewing the second LSB of the status signal 32. If the second LSB is also asserted low, then the pointers within the object have been finished updating. The size field 43 indicates the size of the object that has been moved by the reclamation.

The status states stored in the OTT also make recovery possible in the event of a system power failure. All object modifications are tracked through the OTT. The OTT identifies which objects are in the process of being modified. Should a power failure occur, a state machine will identify which modifications were in progress prior to the power loss and automatically runs a recovery procedure that will recover data from backup flash memory space 26.

Objects are updated after reclamation through a reclaiming in place process. The reclamation process also reads the OTT object. Based on the source address and destination address, it reads the objects to be updated one by one into a RAM location and signals the application for object modification. In K-Java, this modification consists of updating the internal pointer values. The reclamation process stores the delta value by which the pointers within the object need to be incremented during the modification. The call back function allocates the RAM space specified by the input argument object size to read and modify the object data. The reclamation process during a de-allocate operation calls the call back function. On the return, the reclaim in place will update the object in place with the data passed into the allocated RAM space. The DAV then copies the modified data from the RAM space back into flash memory to the destination address location.

Embodiments of the present invention may be implemented in hardware or software, or a combination of both. Embodiments of the invention may be implemented in computer programs executing on programmable computer systems each comprising at least one processor, a data storage system (including volatile and non-volatile memory and/or storage elements), at least one input device, and at least one output device. Program code may be applied to input data to perform the functions described herein and generate output information. The output information may be applied to one or more output devices.

Each program may be implemented in a high level procedural or object oriented programming language to communicate with the computer system. However, the programs may be implemented in assembly or machine language, if desired. In any case, the language may be a compiled or interpreted language.

Each such computer program may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A method of tracking object data during memory reclamation, comprising:
    asserting a status signal to indicate that the memory reclamation has begun on a memory block;
    storing a physical address of a source memory location from where the object data is being moved;
    storing a physical address of a destination memory location;
    modifying the object data; and
    moving the modified object data to the destination memory location.

2. The method of claim 1, further comprising de-asserting the status signal to indicate the object data modification is complete.

3. The method of claim 1, wherein the object data is stored in flash memory.

4. The method of claim 3, wherein the flash memory is a flash electrically erasable read only memory (EEPROM) array.

5. The method of claim 1, wherein the status signal is a four (4) bit signal.

6. The method of claim 1, wherein the object data is an application program file.

7. The method of claim 6, wherein the application program file is a K-Java file.

8. An article comprising a machine readable medium having a plurality of machine readable instructions, wherein when the instructions are executed by a processor, the instructions cause a system to:
    assert a status signal to indicate that reclaim has begun on a memory block including an object;
    store a physical address of a source memory location from where the object is being moved;
    store a physical address of a destination memory location;
    modify the object; and
    move the modified object to the destination memory location.

9. The article of claim 8 comprising a machine readable medium having a plurality of machine readable instructions, wherein when the instructions are executed by a processor, the instructions further cause the system to:
    de-assert the status signal to indicate the object modification is complete.

10. A method of modifying an object after a reclaim process, comprising:
    reading the object to be updated into a random access memory (RAM) location;
    reading an input argument object size;
    signaling an application for modification;
    storing a delta value by which a pointer within the object needs to be incremented; and
    modifying the object if modification needs to be done.

11. The method of claim 10, wherein reading the objects to be updated into the RAM location comprises reading the object currently stored at a destination address within flash memory into RAM location.

12. The method of claim 11, wherein modifying the object if modification needs to be done comprises:
    updating the pointer within the object read into the RAM location based on the delta value; and
    copying the modified object read into the RAM location back into the destination address within the flash memory.

13. The method of claim 12, wherein the application calls a function to modify the object.

14. The method of claim 13, wherein the function returns a Boolean value to indicate that the object modification is not necessary if the application does not need to modify the object.

15. The method of claim 13, wherein the function allocates RAM space required to read the object into the RAM location.

16. The method of claim 15, wherein the function allocates the RAM space specified by the input argument object size.

17. The method of claim 10, wherein the modification to the object is based on the delta value by which the pointer within the object needs to be incremented.

18. An apparatus, comprising:

a unique identifier to validate an object in the apparatus;

a size field to indicate a size of the object to be moved during reclaim;

a status field to indicate a status of the object;

a source address field to track a first memory location from where the object is to be moved; and a destination address field to track a second memory location to where the object is to be moved.

19. The apparatus in claim 18, wherein the apparatus is a paragraph object.

20. The apparatus of claim 18, wherein the apparatus can store an unlimited number of objects.

21. The apparatus of claim 20, wherein each object has a corresponding status field and size field.

22. A method of reclaiming a flash memory block, comprising:

setting a flag to prevent a file interpreter from reclaiming another memory block at the same time;

requesting permission from the file interpreter to do a reclaim on the memory block;

moving valid data to a spare memory block, the valid data being data not scheduled to be erased;

compressing the valid data;

erasing the memory block; and copying the valid data back into the memory block from the spare memory block.

23. The method of claim 22, further comprising:

clearing the flag to indicate that the reclaim on the memory block is complete.

* * * * *